United States Patent
Khan

(10) Patent No.: US 11,451,983 B2
(45) Date of Patent: Sep. 20, 2022

(54) DYNAMIC CAPACITY MANAGEMENT OF A WIRELESS NETWORK

(71) Applicant: AT&T Intellectual Property I, L.P., Atlanta, GA (US)

(72) Inventor: Azhar Khan, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 56 days.

(21) Appl. No.: 17/093,958

(22) Filed: Nov. 10, 2020

(65) Prior Publication Data

US 2022/0150722 A1    May 12, 2022

(51) Int. Cl.
*H04W 16/32* (2009.01)
*H04W 24/02* (2009.01)
*G06N 20/00* (2019.01)
*H04W 16/22* (2009.01)

(52) U.S. Cl.
CPC ............ *H04W 24/02* (2013.01); *G06N 20/00* (2019.01); *H04W 16/22* (2013.01); *H04W 16/32* (2013.01)

(58) Field of Classification Search
CPC .............................. H04W 24/08; H04W 24/10
See application file for complete search history.

(56) References Cited

U.S. PATENT DOCUMENTS

| | | | |
|---|---|---|---|
| 2019/0180633 A1* | 6/2019 | Yoshizawa | G08G 5/0013 |
| 2019/0199756 A1* | 6/2019 | Correnti | H04L 63/205 |
| 2019/0332974 A1* | 10/2019 | Karatekeli | G05D 1/0094 |

* cited by examiner

*Primary Examiner* — Michael T Vu
(74) *Attorney, Agent, or Firm* — Guntin & Gust, PLC; Robert Gingher

(57) ABSTRACT

Methods, systems, and apparatuses, among other things, may dynamically manage the capacity of a wireless network using unmanned vehicles equipped with small cell capabilities. Moreover, past traffic data may be analyzed using artificial intelligence models to predict a volume for a base station that exceeds a capacity for the base station and one or more unmanned vehicles may be dispatched to the base station to provide capacity relief.

20 Claims, 7 Drawing Sheets

200

| Hour of Day (EDT) | Max Available capacity (Gb/s) of Base Station(BS) 102 | Predicted Throughput (Gb/s) for BS 102 (by ML model) | Max Available capacity (Gb/s) of BS 104 | Predicted Throughput (Gb/s) for BS 104 (by ML model) |
|---|---|---|---|---|
| 12AM-1AM | 400 | 200 | 350 | 160 |
| 1AM-2AM | 400 | 190 | 350 | 150 |
| 2AM-3AM | 400 | 160 | 350 | 130 |
| 3AM-4AM | 400 | 140 | 350 | 100 |
| 4AM-5AM | 400 | 120 | 350 | 90 |
| 5AM-6AM | 400 | 120 | 350 | 100 |
| 6AM-7AM | 400 | 130 | 350 | 110 |
| 7AM-8AM | 400 | 140 | 350 | 110 |
| 8AM-9AM | 400 | 180 | 350 | 120 |
| 9AM-10AM | 400 | 240 | 350 | 240 |
| 10AM-11AM | 400 | 460 | 350 | 250 |
| 11AM-12PM | 400 | 470 | 350 | 250 |
| 12PM-1PM | 400 | 450 | 350 | 260 |
| 1PM-2PM | 400 | 300 | 350 | 280 |
| 2PM-3PM | 400 | 250 | 350 | 220 |
| 3PM-4PM | 400 | 270 | 350 | 330 |
| 4PM-5PM | 400 | 220 | 350 | 300 |
| 5PM-6PM | 400 | 300 | 350 | 480 |
| 6PM-7PM | 400 | 330 | 350 | 420 |
| 7PM-8PM | 400 | 340 | 350 | 430 |
| 8PM-9PM | 400 | 300 | 350 | 420 |
| 9PM-10PM | 400 | 320 | 350 | 310 |
| 10PM-11PM | 400 | 390 | 350 | 200 |
| 11PM-12AM | 400 | 280 | 350 | 180 |

410 — Analyze past traffic of a network including a plurality of base stations

420 — Predict a traffic profile (including a predicted volume) for a base station of the plurality of base stations 430 — Identify, based on the traffic profile, that the predicted volume for the base station will exceed a capacity of the base station at a future time 440 — Dispatch a plurality of drones to the base station to increase the capacity of the base station at the future time

FIG. 4

DYNAMIC CAPACITY MANAGEMENT OF A WIRELESS NETWORK

TECHNICAL FIELD

This disclosure relates generally to telecommunications, and more particularly, to a system and method to dynamically manage the capacity of a wireless network using unmanned vehicles equipped with small cell capabilities.

BACKGROUND

The wide adoption of mobile devices along with ubiquitous cellular data coverage has resulted in an unprecedented growth of mobile applications that are dependent on always-accessible wireless networking and fixed wireless broadband access. This rapid growth in the use of mobile applications has placed strains on available resources and has caused resources to become increasingly scarcer. For users, this scarcity may result in dropped calls and poor communication, which may cause user dissatisfaction.

To meet the huge demand for mobile applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

This background information is provided to reveal information believed by the applicant to be of possible relevance. No admission is necessarily intended, nor should be construed, that any of the preceding information constitutes prior art.

SUMMARY

Various embodiments disclosed herein include devices, systems, and methods for dynamically managing the capacity of a network (e.g., wired or wireless) using unmanned vehicles, including terrestrial or non-terrestrial vehicles such as unmanned aerial vehicles (UAVs).

In some embodiments, data (e.g., past traffic data) may be received and the received data may be analyzed using artificial intelligence models (e.g., machine learning models). For example, past traffic data may include information associated with a plurality of base stations (e.g., 4G or 5G base stations) from any time prior to a present point in time. In some embodiments one or more traffic profiles may be predicted for each of one or more base stations. For example, a traffic profile may include a predicted volume for a base station.

In some embodiments, a future connectivity issue may be identified based on a predicted traffic profile. For example, volume exceeding a capacity of a particular base station at a future time may be identified based on a particular predicted traffic profile. In some embodiments, one or more unmanned vehicles (e.g., terrestrial or non-terrestrial) may be dispatched to an identified base station to increase capacity of the base station. For example, a number of UAVs equipped with cell capabilities may be dispatched from an unmanned vehicle garage to provide capacity relief to the identified base station. In some embodiments, each of one or more base stations may be equipped with a platform that allows a plurality of unmanned vehicles to camp on the platform for an extended period of time (e.g., hours/days/weeks/months). For example, the platform may be capable of electrically charging one or more batteries of the first plurality of unmanned vehicles so the unmanned vehicles may continue to provide capacity relief to the base station.

In some embodiments, a first traffic profile may be predicted for a first cell and it may be predicted that a first predicted volume will exceed a first capacity of the first base station at a first future time. Accordingly unmanned vehicles may be submitted (e.g., from an unmanned vehicle garage) to the first base station to increase capacity at the first base station at the first future time. Moreover, a second traffic profile may be predicted for a second base station and it may be predicted that a second predicted volume will exceed a second capacity of the second base station at a second future time. In some embodiments, unmanned vehicles may be submitted from the first base station to the second base station to increase capacity at the second base station at the second future time.

In accordance with some embodiments, a non-transitory computer readable storage medium has stored therein instructions that are computer executable to perform or cause performance of any of the methods described herein. In accordance with some embodiments, a device includes one or more processors, a non-transitory memory, and one or more programs; the one or more programs are stored in the non-transitory memory and configured to be executed by the one or more processors and the one or more programs include instructions for performing or causing performance of any of the methods described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

FIG. 2 illustrates an exemplary traffic profile in accordance with the present disclosure.

FIG. 4 is an exemplary flowchart of a method to dynamically manage the capacity of a wireless network using unmanned vehicles.

Figure 1:
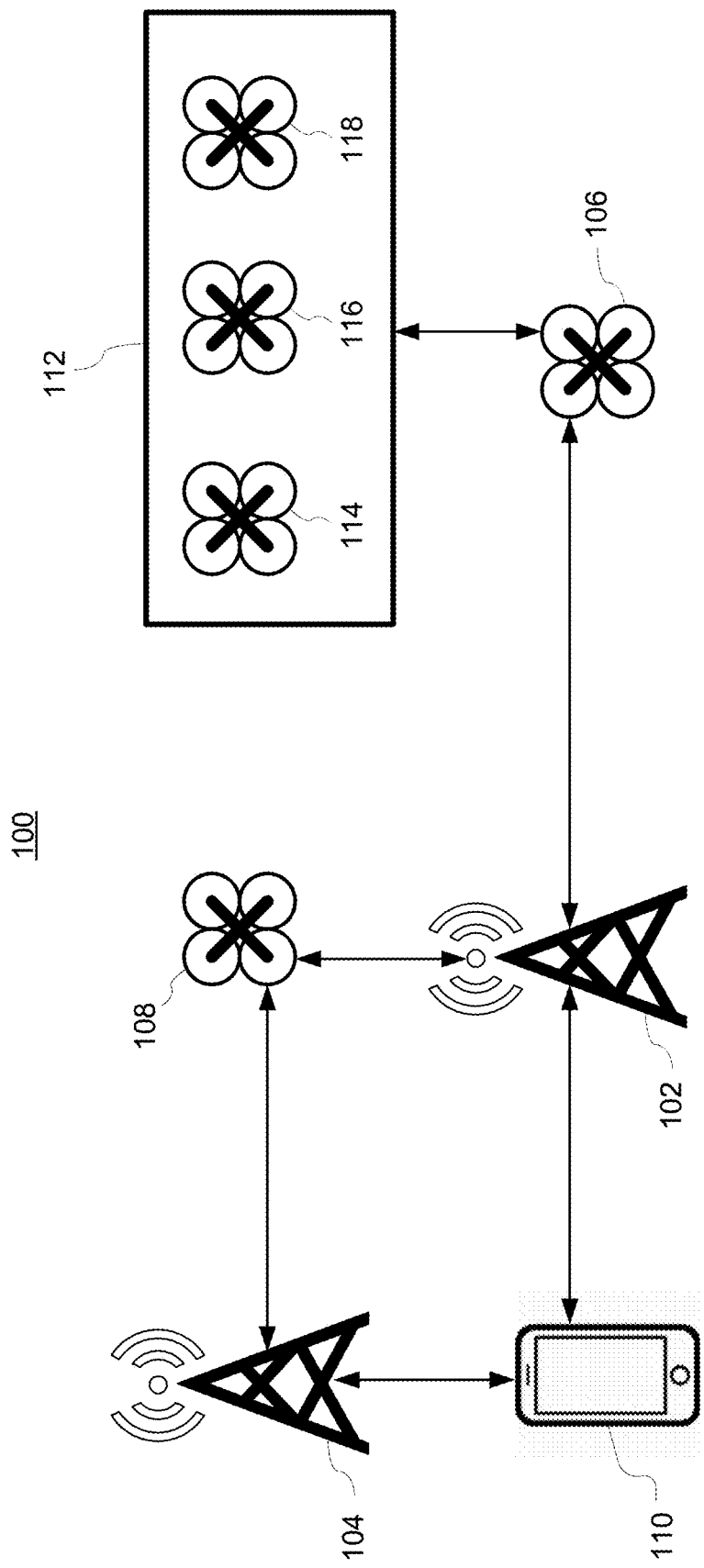
FIG. 1 illustrates an exemplary system to dynamically manage the capacity of a network using unmanned vehicles in accordance with the present disclosure.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

In some embodiments, an automated method and process dynamically manages the capacity of a wireless network using Artificial Intelligence (AI). For example, embodiments may employ Machine Learning (ML) and unmanned vehicles (e.g., terrestrial or non-terrestrial) fitted with small wireless cells. AI models may analyze wireless traffic and capacity of any base station (e.g., 4G or 5G). Moreover, embodiments may predict a traffic profile for any base station which may be for the following day/week/month. For example, neural network models may model traffic characteristics of a base station. Traffic data (e.g., up to 2 years in the past) may be fed to the models to derive predictions for future traffic patterns. Thus, for any given day, if a prediction shows a base station will experience volumes exceeding its capacity, unmanned vehicles may be automatically dispatched to the base station for the duration of the excess volume period to provide capacity relief. For example, unmanned vehicles may be equipped with small cell capabilities. Moreover, when the excess capacity event is over, one or more unmanned vehicles may travel to the next base station needing relief; the process may be continued until there is no longer an unmet need or the one or more unmanned vehicles need to return to a home garage for service and maintenance.

FIG. 1 is a diagram illustrating a communication system 100 (e.g., providing telecommunication services such as telephony, video, data, messaging, and broadcasts) in which aspects of the present disclosure may be practiced. In some embodiments, the communication system 100 is an LTE network or some other wireless network, such as a 5G or NR network. It is noted that while aspects may be described herein using terminology commonly associated with 3G or 4G wireless technologies, aspects of the present disclosure can be applied in other generation-based communication systems, such as 5G and later.

In some embodiments, communication system 100 employs multiple-access technologies capable of supporting communication with multiple users by sharing available system resources (e.g., bandwidth, transmit power, etc.). For example, multiple-access technologies may include CDMA systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and LTE, where LTE/LTE-Advanced is a set of enhancements to the UMTS mobile standard promulgated by the 3GPP.

It should be noted that the above multiple access technologies have been adopted in various telecommunication standards to provide a common protocol that enables a user equipment (UE) to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) orthogonal frequency division multiplexing (CP-OFDM) on the downlink (DL), using CP-OFDM and/or SC-FDMA (e.g., also known as discrete Fourier transform spread OFDM (DFT-s-OFDM)) on the uplink (UL), as well as supporting beamforming, MIMO antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

The communication system 100 may include one or more networks or one or more network devices (e.g., base stations 102/104 or unmanned vehicles 106/108). For example, base stations 102/104 or unmanned vehicles 106/108 may be included in a larger group of network devices of a wireless network. According to an embodiment, a network device can be referred to as a base station (BS), Node B, eNodeB, gNB, access points (AP), radio head, transmit receive point (TRP), new radio (NR) BS, 5G Node B, and so on. In embodiments, a communication component of a network device can be a transmitter/receiver configured to transmit to or receive data from the network device to other network devices. Through the communication component, the network device can concurrently transmit and receive data, the network device can transmit and receive data at different times, or combinations thereof.

The network devices can also comprise a memory operatively coupled to a processor. The memory can store protocols associated with facilitating antenna connectivity for UEs as discussed herein. Further, the memory can facilitate action to control communication between the network device and UEs, such that the communication system 100 can employ stored protocols and/or algorithms to achieve improved communications in a wireless network as described herein.

In some embodiments, the communication system 100 includes a number of UEs, for example, one or more UAVs (e.g., unmanned vehicles 106/108) and one or more terrestrial UEs (e.g., mobile device 110). A UE may communicate with a network device via a downlink and an uplink. For example, the downlink (or forward link) may refer to the communication link from base station 104 to mobile device 110, and the uplink (or reverse link) may refer to the communication link from mobile device 110 to the base station 104. Further, a UE may comprise a memory operatively coupled to a processor. The memory can store protocols associated with facilitating antenna connectivity for UEs as discussed herein. Further, the memory can facilitate action to control communication between a UE and a network device, such that the communication system 100 can employ stored protocols or algorithms to achieve improved communications in a wireless network as described herein.

In some embodiments, a UE and a network device may be included on a single device. For example, unmanned vehicles 106 and 108 may include both a network device (e.g., small cell capabilities) and a UE. Moreover, unmanned vehicles 106 and 108 may communicate with other network devices or enhance the capabilities of other network devices. Although, for illustration purposes, a small number of unmanned vehicles and a single terrestrial UE (e.g., mobile device 110) are illustrated, the communication system 100 may include a multitude of unmanned vehicles, terrestrial UEs, or base stations.

In some embodiments, an unmanned vehicle garage 112 may house one or more unmanned vehicles (e.g., unmanned vehicles 114/116/118). For example, unmanned vehicles 114/116/118 may be automatically deployed from unmanned vehicle garage 112. Moreover, unmanned vehicles 114/116/118 may electrically charge (e.g., one or more batteries of the unmanned vehicles 114/116/118) or receive any necessary maintenance while housed or located at unmanned vehicle garage 112.

According to some embodiments, unmanned vehicle garage 112 may issue singular or multiple dispatch instructions to unmanned vehicles 114/116/118. For example, a server located at the unmanned vehicle garage 112 or communicatively connected with the unmanned vehicle garage 112 may issue instructions to unmanned vehicles 114/116/118. For example, unmanned vehicle garage 112 may direct one or more unmanned vehicles (e.g., unmanned vehicles 114/116/118) to only a single base station or to multiple base stations (e.g., according to a time schedule). According to some embodiments, one or more unmanned vehicles (e.g., unmanned vehicles 114/116/118) may receive a signal (e.g., a distress signal) instructing the unmanned vehicle(s) to a particular base station (e.g., base stations 102/104) or to unmanned vehicle garage 112.

Moreover, according to some embodiments, communication with unmanned vehicles (e.g., unmanned vehicles 114/116/118) may take place via control channels. For example, rather than acting only as a UE for communication purposes, unmanned vehicles may communicate through any number of communication channels (e.g., wired communication or wireless communication). In some embodiments, the unmanned vehicle garage 112 may include one or more sensors for detecting unmanned vehicles 112/114/116.

In an example, AI such as ML may be used to analyze past traffic of the network 100 (e.g., from any time prior to a present point in time). Based on the analysis, a traffic profile including a predicted volume may be predicted for one or more base stations (e.g., base stations 102/104). Moreover, AI models may be constantly trained with recent base station or network traffic data to continuously improve accuracy of the AI models.

For example, as illustrated in FIG. 2, a traffic profile may include information (e.g., for base stations 102/104) including time of day (e.g., time of day 202), predicted volume (e.g., predicted throughput 204/208), or available capacity (e.g., max available capacity 206/210). As illustrated in the example, a time period 212 (e.g., 10 AM-1 PM) may be identified where the predicted volume 206 for base station 102 exceeds the maximum available capacity 204 of base station 102. As another example, a time period 214 (e.g., 5 PM-9 PM) may be identified where the predicted volume 210 for base station 104 exceeds the maximum available capacity 208 of base station 104.

According to some embodiments, the maximum available capacity may be based on manufacturer's technical specifications, network provider technical specifications, safety standards, industry regulations, etc. According to the example in FIG. 2, the predicted throughput 204 (e.g., 450-470 Gigabytes per second) will exceed the maximum available capacity 202 (e.g., 400 Gigabytes per second) for the time period 208 (e.g., 10 AM-1 PM).

If it is determined based on a predicted traffic profile, that a predicted volume for a base station (e.g., base stations 102/104) will exceed a capacity of the base station at a future time, one or more unmanned vehicles including cell capabilities (e.g., unmanned vehicles 114/116/118) may be dispatched from unmanned vehicle garage 112 to the base station to increase the capacity of the base station. For example, it may be determined that a predicted volume for base station 102 will exceed a capacity of base station 102 and unmanned vehicle 106 may be dispatched by a dispatch program to base station 102 from unmanned vehicle garage 112 to increase the capacity of base station 102. According to some embodiments, cell splitting may be used to subdivide base station 102, e.g., increasing the number of base stations to include both base station 102 and unmanned vehicle 106.

In some embodiments, an unmanned vehicle may be directed to return to the unmanned vehicle garage 112 (e.g., for charging, service, or maintenance) after increasing the capacity of a base station. For example, unmanned vehicle 106 may be directed to return to unmanned vehicle garage 112 once the volume of base station 102 no longer exceeds the capacity of base station 102.

In some embodiments, an unmanned vehicle may be directed from a first base station to a second base station based on determining that a predicted volume for a second base station will exceed the capacity of the second base station. For example, it may be determined that a predicted volume for base station 104 will exceed a capacity of base station 104 and unmanned vehicle 108 may be dispatched from base station 102 to base station 104 to increase the capacity of base station 104. Moreover, directions for the unmanned vehicles (e.g., identification of a base station) may be provided by a dispatch engine or via unmanned vehicle to base station communications (e.g., a broadcast from a base station advertising either a need or available capacity, or a broadcast from an unmanned vehicles advertising either a need or available capacity) or vice versa.

Accordingly, in some embodiments, dropped communication sessions (e.g., voice calls or data sessions) due to a base station becoming overloaded (e.g., reaching a threshold number of communication sessions or bandwidth) may be reduced or eliminated. Moreover, poor customer experiences resulting from poor cell service quality may be improved and customer churn due to poor wireless call or data experience may be reduced. In some embodiments, costs may be reduced by proactively and automatically dispatching excess capacity (e.g., via unmanned vehicles) to base stations that need it and thus reduce costs.

Figure 3:
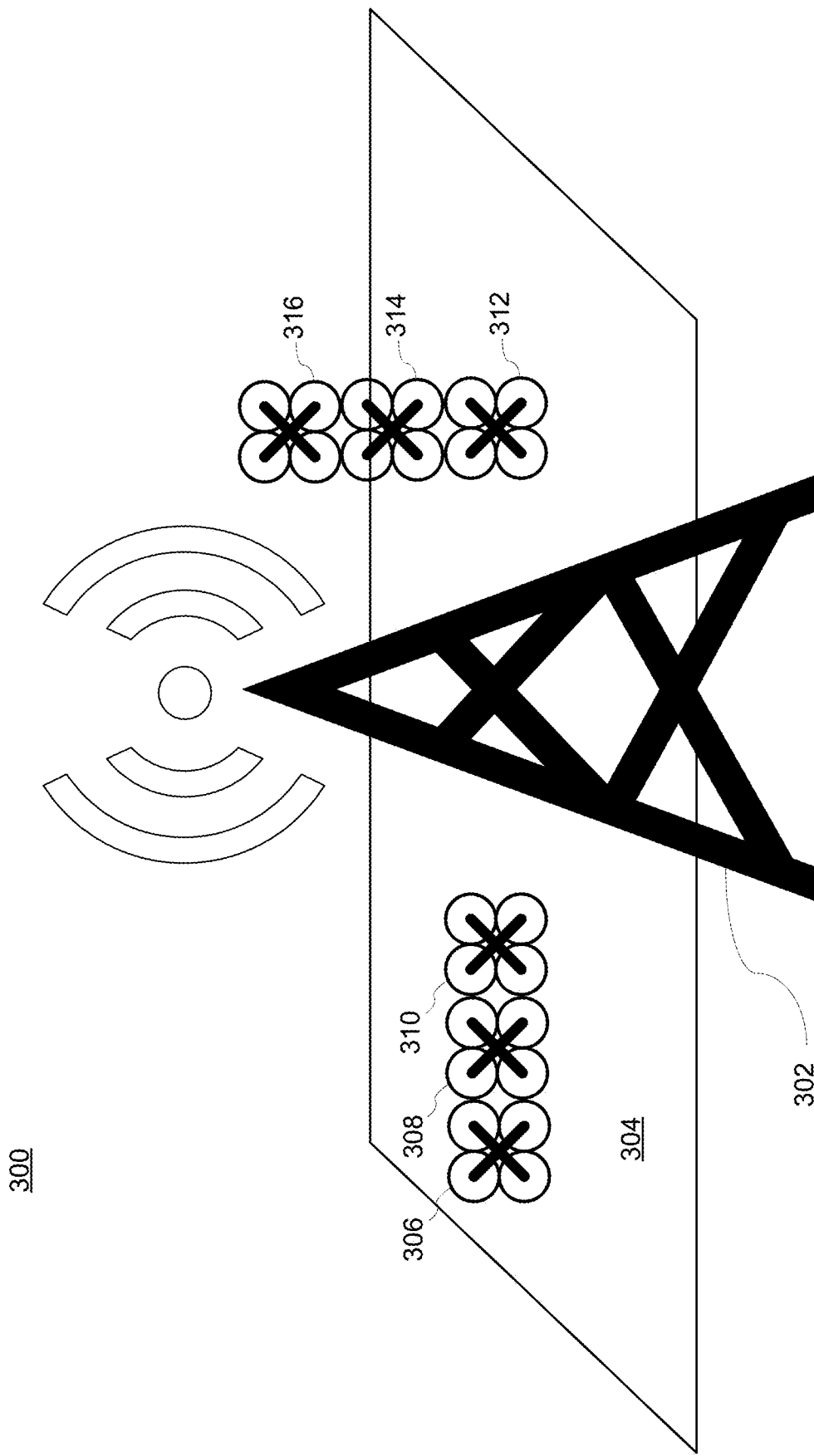
FIG. 3 illustrates an exemplary base station in accordance with the present disclosure.

As illustrated in FIG. 3, in some embodiments, a base station 300 may include a cell tower 302 with a platform 304 that allows one or more unmanned vehicles 306/308/310/312/314/316 to camp onto the base station 300 for an extended period of time to provide capacity relief. For example, platform 304 may include one or more electrical chargers which enable drones 306/308/310/312/314/316 to recharge their batteries and remain camped on the platform 304 for hours, days, weeks, months, etc. Moreover, in some embodiments, the platform 304 may include sufficient real estate to allow unmanned vehicles 306/308/310/312/314/316 to camp out, e.g., in rows (e.g., unmanned vehicles 306/308/310), columns (e.g., drones 312/314/316), or one on top of another. At some point, unmanned vehicles 306/308/310/312/314/316 may be dispatched to another base station (e.g., base stations 102/104) or may return to unmanned vehicle garage 112 (e.g., for service and to await further dispatch instructions).

FIG. 4 illustrates an exemplary flowchart of a method 400 to dynamically manage the capacity of a wireless network using AI (e.g., ML) and unmanned vehicles (e.g., terrestrial or non-terrestrial) fitted with small wireless cells. The method 400 may be performed at a network device, UE, desktop, laptop, mobile device, server device, or by multiple devices in communication with one another. In some examples, the method 400 is performed by processing logic, including hardware, firmware, software, or a combination thereof. In some examples, the method 400 is performed by a processor executing code stored in a computer-readable medium (e.g., memory).

As shown in method 400, at block 410, there may be analysis of past traffic (e.g., from any time prior to a present point in time) of a network 100 including a plurality of base stations (e.g., base stations 102, 104, and 200). The analysis for the past traffic may be for a predetermined threshold of time, such as days, weeks, months, or years. For example, AI models may be used to analyze up to two years of traffic data for any given base station.

At block 420, the method 400 may predict a traffic profile for a base station of the plurality of base stations based on the analysis of the past traffic at block 410. For example, the traffic profile may include a predicted volume for the base station.

At block 430, the method 400 may identify, based on the traffic profile predicted at block 420, that the predicted volume for the base station will exceed a capacity of the base station at a future time.

At block 440, the method 400 may dispatch a plurality of unmanned vehicles to the base station to increase the capacity of the base station at the future time.

Figure 5:
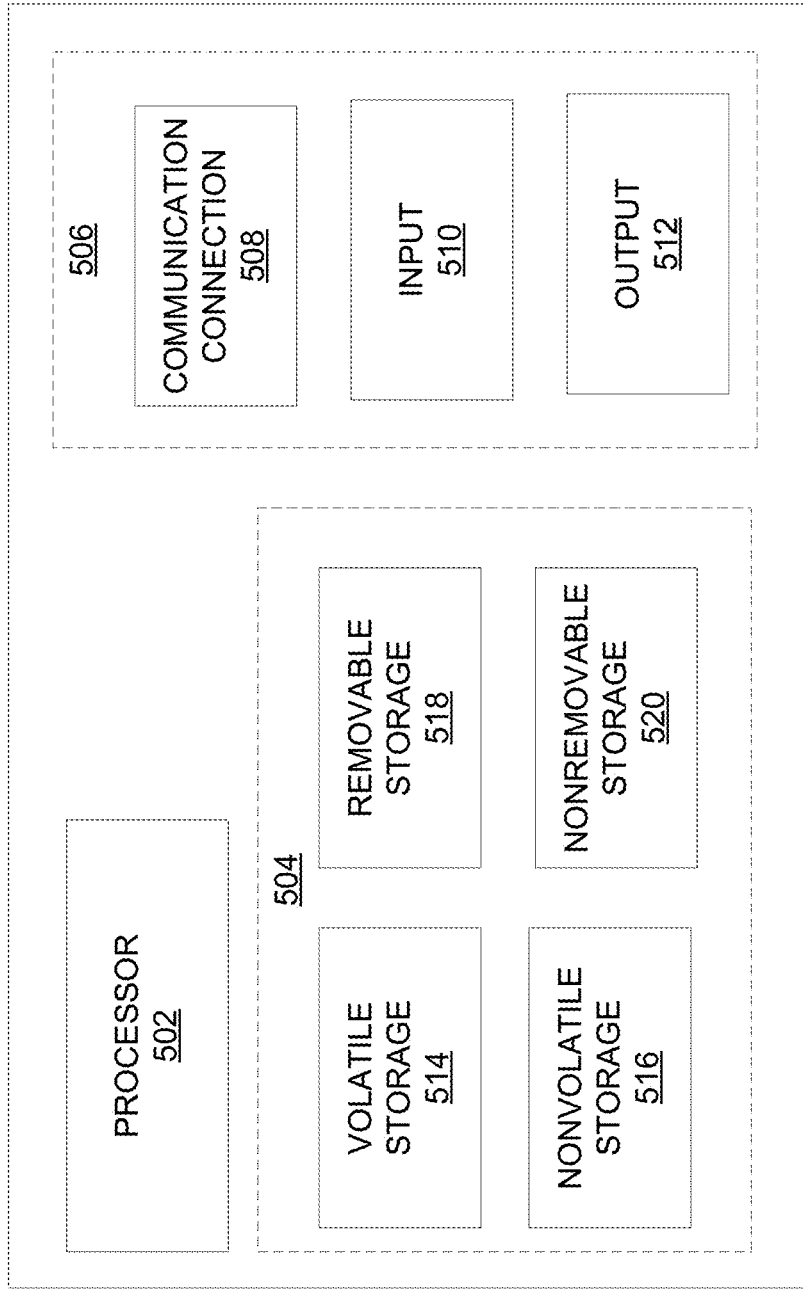
FIG. 5 illustrates a schematic of an exemplary network device.

FIG. 5 is a block diagram of network device 500 that may be connected to or comprise a component of communication system 100. Network device 500 may comprise hardware or a combination of hardware and software. The functionality to facilitate telecommunications via a telecommunications network may reside in one or a combination of network devices 500. Network device 500 depicted in FIG. 5 may represent or perform functionality of an appropriate network device 500, or a combination of network devices 500, such as, for example, a component or various components of a cellular broadcast system wireless network, a processor, a server, a gateway, an LTE or 5G anchor node or eNB, a mobile switching center (MSC), a short message service center (SMSC), an automatic location function server (ALFS), a gateway mobile location center (GMLC), a serving gateway (S-GW) 430, a packet data network (PDN) gateway, an RAN, a serving mobile location center (SMLC), or the like, or any appropriate combination thereof. It is emphasized that the block diagram depicted in FIG. 4 is exemplary and not intended to imply a limitation to a specific embodiment or configuration. Thus, network device 500 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 500 may comprise a processor 502 and a memory 504 coupled to processor 502. Memory 504 may contain executable instructions that, when executed by processor 502, cause processor 502 to effectuate operations associated with managing capacity of a wireless network. As evident from the description herein, network device 500 is not to be construed as software per se.

In addition to processor 502 and memory 504, network device 500 may include an input/output system 506. Processor 502, memory 504, and input/output system 506 may be coupled together (coupling not shown in FIG. 5) to allow communications between them. Each portion of network device 500 may comprise circuitry for performing functions associated with each respective portion. Thus, each portion may comprise hardware, or a combination of hardware and software. Accordingly, each portion of network device 500 is not to be construed as software per se. Input/output system 506 may be capable of receiving or providing information from or to a communications device or other network entities configured for telecommunications. For example, input/output system 506 may include a wireless communications (e.g., 3G/4G/5G/GPS) card. Input/output system 506 may be capable of receiving or sending video information, audio information, control information, image information, data, or any combination thereof. Input/output system 506 may be capable of transferring information with network device 500. In various configurations, input/output system 506 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 506 may comprise a Wi-Fi finder, a two-way GPS chipset or equivalent, or the like, or a combination thereof.

Input/output system 506 of network device 500 also may contain a communication connection 508 that allows network device 500 to communicate with other devices, network entities, or the like. Communication connection 508 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 506 also may include an input device 510 such as keyboard, mouse, pen, voice input device, or touch input device. Input/output system 506 may also include an output device 512, such as a display, speakers, or a printer.

Processor 502 may be capable of performing functions associated with telecommunications, such as functions for managing capacity of a wireless network, as described herein. For example, processor 502 may be capable of, in conjunction with any other portion of network device 500, predicting a volume for a base station, determining that the predicted volume of the base station will exceed a capacity of the base station, and dispatching one or more unmanned vehicles to the base station to increase the capacity of the base station, as described herein.

Memory 504 of network device 500 may comprise a storage medium having a concrete, tangible, physical structure. As is known, a signal does not have a concrete, tangible, physical structure. Memory 504, as well as any computer-readable storage medium described herein, is not to be construed as a signal. Memory 504, as well as any computer-readable storage medium described herein, is not to be construed as a transient signal. Memory 504, as well as any computer-readable storage medium described herein, is not to be construed as a propagating signal. Memory 504, as well as any computer-readable storage medium described herein, is to be construed as an article of manufacture.

Memory 504 may store any information utilized in conjunction with telecommunications. Depending upon the exact configuration or type of processor, memory 504 may include a volatile storage 514 (such as some types of RAM), a nonvolatile storage 516 (such as ROM, flash memory), or a combination thereof. Memory 504 may include additional storage (e.g., a removable storage 518 or a non-removable storage 520) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 500. Memory 504 may comprise executable instructions that, when executed by processor 502, cause processor 502 to effectuate operations to manage capacity of a wireless network.

Figure 6:
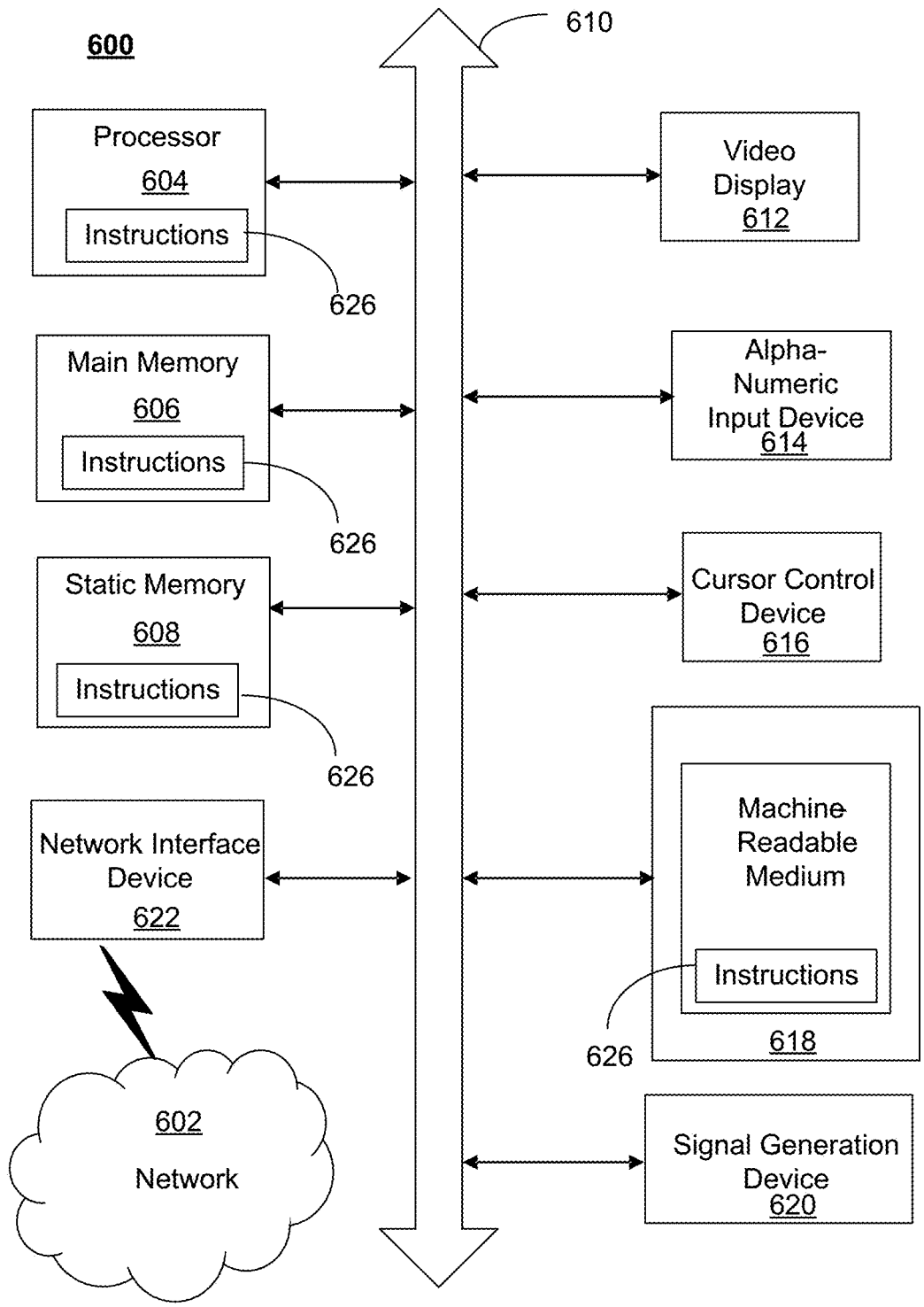
FIG. 6 illustrates a schematic of an exemplary machine in the form of a computer system.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as processor 602, network devices 102/104/300, unmanned vehicles 106/108/114/116/118/306/308/310/312/314/316, mobile device 110, and other devices of FIG. 1, FIG. 2, and FIG. 3. In some examples, the machine may be connected (e.g., using a network 602) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 600 may include a processor (or controller) 604 (e.g., a central processing unit (CPU)), a graphics processing unit (GPU, or both), a main memory 606 and a static memory 608, which communicate with each other via a bus 610. The computer system 600 may further include a display unit 612 (e.g., a liquid crystal display (LCD), a flat panel, or a solid-state display). Computer system 600 may include an input device 614 (e.g., a keyboard), a cursor control device 616 (e.g., a mouse), a disk drive unit 618, a signal generation device 620 (e.g., a speaker or remote control) and a network interface device 622. In distributed environments, the examples described in the subject disclosure can be adapted to utilize multiple display units 612 controlled by two or more computer systems 600. In this configuration, presentations described by the subject disclosure may in part be shown in a first of display units 612, while the remaining portion is presented in a second of display units 612.

The disk drive unit 618 may include a tangible computer-readable storage medium on which is stored one or more sets of instructions (e.g., instructions 626) embodying any one or more of the methods or functions described herein, including those methods illustrated above. Instructions 626 may also reside, completely or at least partially, within main memory 606, static memory 608, or within processor 604 during execution thereof by the computer system 600. Main memory 606 and processor 604 also may constitute tangible computer-readable storage media.

Figure 7:
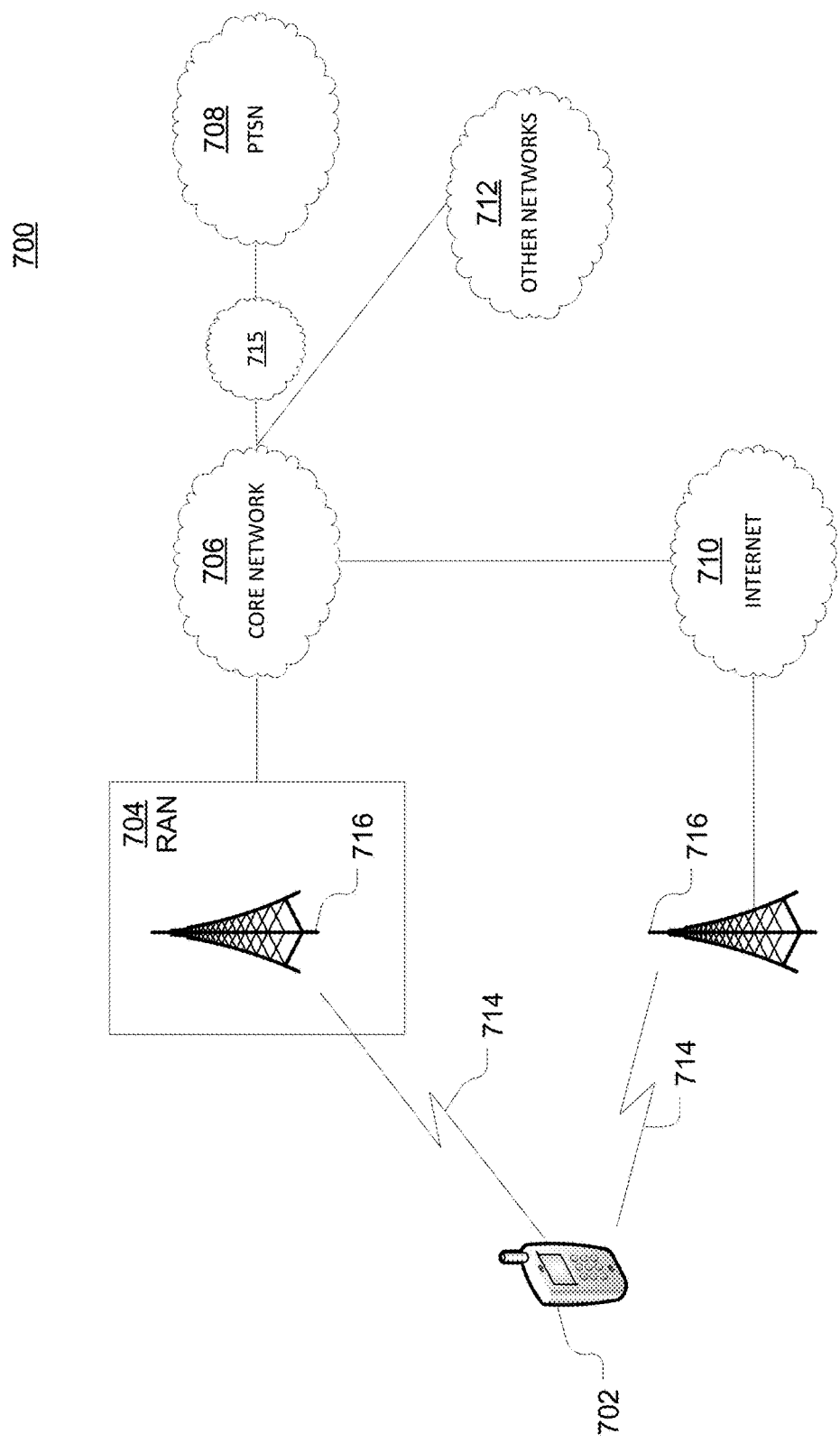
FIG. 7 illustrates an exemplary communication system that provides wireless telecommunication services over wireless communication networks.

As shown in FIG. 7, telecommunication system 700 may include wireless transmit/receive units (WTRUs) 702, a RAN 704, a core network 706, a public switched telephone network (PSTN) 708, the Internet 710, or other networks 712, though it will be appreciated that the disclosed examples contemplate any number of WTRUs, BSs, networks, or network elements. Each WTRU 702 may be any type of device configured to operate or communicate in a wireless environment. For example, a WTRU may comprise network devices 102/104/300, unmanned vehicles 106/108/114/116/118/306/308/310/312/314/316, mobile device 110, or the like, or any combination thereof. By way of example, WTRUs 702 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 702 may be configured to transmit or receive wireless signals over an air interface 714.

Telecommunication system 700 may also include one or more base stations 716. Each of base stations 716 may be any type of device configured to wirelessly interface with at least one of the WTRUs 702 to facilitate access to one or more communication networks, such as core network 706, PSTN 708, Internet 710, or other networks 712. By way of example, base stations 716 may be a BTS, a Node-B, an eNodeB, a Home Node B, a Home eNodeB, a site controller, an AP, a wireless router, or the like. While base stations 716 are each depicted as a single element, it will be appreciated that base stations 716 may include any number of interconnected base stations or network elements.

RAN 704 may include one or more base stations 716, along with other network elements (not shown), such as a BSC, an RNC, or relay nodes. One or more base stations 716 may be configured to transmit or receive wireless signals within a particular geographic region, which may be referred to as a cell (not shown). The cell may further be divided into cell sectors. For example, the cell associated with base station 716 may be divided into three sectors such that base station 716 may include three transceivers: one for each sector of the cell. In another example, base station 716 may employ MIMO technology and, therefore, may utilize multiple transceivers for each sector of the cell.

Base stations 716 may communicate with one or more of WTRUs 702 over air interface 714, which may be any suitable wireless communication link (e.g., RF, microwave, infrared (IR), ultraviolet (UV), or visible light). Air interface 714 may be established using any suitable radio access technology (RAT).

More specifically, as noted above, telecommunication system 700 may be a multiple access system and may employ one or more channel access schemes, such as CDMA, TDMA, FDMA, OFDMA, SC-FDMA, or the like. For example, base station 716 in RAN 704 and WTRUs 702 connected to RAN 704 may implement a radio technology such as Universal Mobile Telecommunications System (UMTS) Terrestrial Radio Access (UTRA) that may establish air interface 714 using wideband CDMA (WCDMA). WCDMA may include communication protocols, such as HSPA or HSPA+. HSPA may include High-Speed Downlink Packet Access (HSDPA) or High-Speed Uplink Packet Access (HSUPA).

As another example, base station 716 and WTRUs 702 that are connected to RAN 704 may implement a radio technology such as Evolved UMTS Terrestrial Radio Access (E-UTRA), which may establish air interface 714 using LTE or LTE-Advanced (LTE-A).

Optionally, base station 716 and WTRUs 702 connected to RAN 704 may implement radio technologies such as IEEE 702.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 716 may be a wireless router, Home Node B, Home eNodeB, or access point, for example, and may utilize any suitable RAT for facilitating wireless connectivity in a localized area, such as a place of business, a home, a vehicle, a campus, or the like. For example, base station 716 and associated WTRUs 702 may implement a radio technology such as IEEE 702.11 to establish a wireless local area network (WLAN). As another example, base station 716 and associated WTRUs 702 may implement a radio technology such as IEEE 702.15 to establish a wireless personal area network (WPAN). In yet another example, base station 716 and associated WTRUs 702 may utilize a cellular-based RAT (e.g., WCDMA, CDMA2000, GSM, LTE, LTE-A, etc.) to establish a picocell or femtocell. As shown in FIG. 6, base station 716 may have a direct connection to Internet 710. Thus, base station 716 may not be required to access Internet 710 via core network 706.

RAN 704 may be in communication with core network 706, which may be any type of network configured to provide voice, data, applications, and/or voice over internet protocol (VoIP) services to one or more WTRUs 702. For example, core network 706 may provide call control, billing services, mobile location-based services, pre-paid calling, Internet connectivity, video distribution or high-level security functions, such as user authentication. Although not shown in FIG. 6, it will be appreciated that RAN 704 or core network 706 may be in direct or indirect communication with other RANs that employ the same RAT as RAN 704 or a different RAT. For example, in addition to being connected to RAN 704, which may be utilizing an E-UTRA radio technology, core network 706 may also be in communication with another RAN (not shown) employing a GSM radio technology.

Core network 706 may also serve as a gateway for WTRUs 702 to access PTSN 708, Internet 710, or other networks 712. PSTN 708 may include circuit-switched telephone networks that provide plain old telephone service (POTS). For LTE core networks, core network 706 may use IP Multimedia Subsystem (IMS) core 715 to provide access to PSTN 708. Internet 710 may include a global system of interconnected computer networks or devices that use common communication protocols, such as the transmission control protocol (TCP), user datagram protocol (UDP), or IP in the TCP/IP internet protocol suite. Other networks 712 may include wired or wireless communications networks owned or operated by other service providers. For example, other networks 712 may include another core network connected to one or more RANs, which may employ the same RAT as RAN 704 or a different RAT.

Some or all WTRUs 702 in telecommunication system 700 may include multi-mode capabilities. For example, WTRUs 702 may include multiple transceivers for communicating with different wireless networks over different wireless links. For example, one or more WTRUs 702 may be configured to communicate with base station 716, which may employ a cellular-based radio technology, and with base station 716, which may employ an IEEE 802 radio technology.

The various aspects described herein can relate to NR, which can be deployed as a standalone radio access technology or as a non-standalone radio access technology assisted by another RAT, such as LTE, for example. It should be noted that although various aspects and embodiments have been described herein in the context of 5G, UMTS, and/or LTE, or other next generation networks, the disclosed aspects are not limited to 5G, a UMTS embodiment, and/or an LTE embodiment as the techniques can also be applied in 3G, 4G, or LTE systems. For example, aspects or features of the disclosed embodiments can be exploited in substantially any wireless communication technology. Such wireless communication technologies can include UMTS, CDMA, Wi-Fi, WiMAX, GPRS, Enhanced GPRS, 3GPP, LTE, 3GPP2, UMB, HSPA, HSPA+, HSDPA, HSUPA, Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second supported for tens of thousands of users; at least one gigabit per second to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

An aspect of 5G, which differentiates from previous 4G systems, is the use of NR. NR architecture can be designed to support multiple deployment cases for independent configuration of resources used for random-access channel (RACH) procedures. Since the NR can provide additional services than those provided by LTE, efficiencies can be generated by leveraging the pros and cons of LTE and NR to facilitate the interplay between LTE and NR.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which capacity of a dynamic network can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—managing capacity of a wireless network—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods.

What is claimed:

1. A method comprising:
 analyzing, by a processing system including a processor, past traffic of a network, wherein the network includes a plurality of base stations;
 predicting, by the processing system, based on the analyzing of the past traffic of the network, a first traffic profile for a first base station of the plurality of base stations, wherein the first traffic profile includes a first predicted volume of first communication traffic associated with user equipment carried by the first base station, and wherein the first base station includes a first network device for carrying the first communication traffic;
 identifying, by the processing system, based on the first traffic profile, that the first predicted volume for the first base station will exceed a first capacity of the first base station at a first future time; and
 dispatching, by the processing system, a first unmanned vehicle to the first base station to increase the first capacity of the first base station at the first future time, wherein the first unmanned vehicle includes a second network device, and wherein the first unmanned vehicle increases the first capacity of the first base station at the first future time by carrying second communication traffic associated with the user equipment via the second network device.

2. The method of claim 1, wherein the analyzing of the past traffic of the network is completed by one or more artificial intelligence models.

3. The method of claim 2, wherein the one or more artificial intelligence models include one or more machine learning models.

4. The method of claim 1, wherein the first unmanned vehicle is equipped with cell capabilities.

5. The method of claim 1, wherein the first base station is equipped with a platform that allows the first unmanned vehicle to camp on the platform for an extended period of time.

6. The method of claim 5, wherein the platform is capable of electrically charging one or more batteries of the first unmanned vehicle.

7. The method of claim 1, wherein the first unmanned vehicle is dispatched from an unmanned vehicle garage.

8. The method of claim 1, further comprising:
 predicting, by the processing system, based on the analyzing of the past traffic, a second traffic profile for a second base station of the plurality of base stations;
 identifying, by the processing system, based on the second traffic profile, that a second predicted volume for the second base station will exceed a second capacity of the second base station at a second future time; and
 dispatching, by the processing system, a second unmanned vehicle to the second base station to increase the second capacity of the second base station at the second future time, wherein the second unmanned vehicle includes a third network device, and wherein the second unmanned vehicle increases the second capacity of the second base station at the second future time by carrying third communication traffic associated with the user equipment via the third network device.

9. The method of claim 8, wherein the second unmanned vehicle is dispatched from the first base station.

10. A system comprising:
 one or more processors; and
 memory including instructions that, when executed by the one or more processors, cause the system to perform operations comprising:
 analyzing past traffic of a network, wherein the network includes a plurality of base stations;
 predicting, based on the analyzing of the past traffic of the network, a first traffic profile for a first base station of the plurality of base stations, wherein the first traffic profile includes a first predicted volume of first communication traffic associated with user equipment carried by the first base station, and wherein the first base station includes a first network device for carrying the first communication traffic;

identifying, based on the first traffic profile, that the first predicted volume for the first base station will exceed a first capacity of the first base station at a first future time; and dispatching a first unmanned vehicle to the first base station to increase the first capacity of the first base station at the first future time, wherein the first unmanned vehicle includes a second network device, and wherein the first unmanned vehicle increases the first capacity of the first base station at the first future time by carrying second communication traffic associated with the user equipment via the second network device.

11. The system of claim 10, wherein the analyzing of the past traffic of the network is completed by one or more artificial intelligence models.

12. The system of claim 11, wherein the one or more artificial intelligence models include one or more machine learning models.

13. The system of claim 10, wherein the first unmanned vehicle is equipped with cell capabilities.

14. The system of claim 10, wherein the first base station is equipped with a platform that allows the first unmanned vehicle to camp on the platform for an extended period of time.

15. The system of claim 14, wherein the platform is capable of electrically charging one or more batteries of the first unmanned vehicle.

16. The system of claim 10, wherein the first unmanned vehicle is dispatched from an unmanned vehicle garage.

17. The system of claim 10, wherein the instructions are further configured to cause the system to:

predicting, based on the analyzing of the past traffic, a second traffic profile for a second base station of the plurality of base stations;

identifying, based on the second traffic profile, that a second predicted volume for the second base station will exceed a second capacity of the second base station at a second future time; and dispatching a second unmanned vehicle to the second base station to increase the second capacity of the second base station at the second future time, wherein the second unmanned vehicle includes a third network device, and wherein the second unmanned vehicle increases the second capacity of the second base station at the second future time by carrying third communication traffic associated with the user equipment via the third network device.

18. The system of claim 17, wherein the second unmanned vehicle is dispatched from the first base station.

19. A non-transitory computer program product comprising:

a computer-readable storage medium; and instructions stored on the computer-readable storage medium that, when executed by a processor, causes the processor to perform operations comprising:

analyzing past traffic of a network, wherein the network includes a plurality of base stations;

predicting, based on the analyzing of the past traffic, a traffic profile for a base station of the plurality of base stations, wherein the traffic profile includes a predicted volume of first communication traffic associated with user equipment carried by the base station, and wherein the base station includes a first network device for carrying the first communication traffic;

identifying, based on the traffic profile, that the predicted volume for the base station will exceed a capacity of the base station at a future time; and dispatching an unmanned vehicle to the base station to increase the capacity of the base station at the future time, wherein the unmanned vehicle includes a second network device, and wherein the unmanned vehicle increases the capacity of the base station at the future time by carrying second communication traffic associated with the user equipment via the second network device.

20. The non-transitory computer program product of claim 19, wherein the analyzing of the past traffic of the network is completed by one or more artificial intelligence models.

* * * * *